United States Patent
Flierl et al.

(10) Patent No.: US 7,616,824 B2
(45) Date of Patent: Nov. 10, 2009

(54) METHOD FOR SPATIALLY SCALABLE VIDEO CODING

(75) Inventors: Markus Flierl, Palo Alto, CA (US); Pierre Vandergheynst, Pully (CH)

(73) Assignee: Ecole Polytechnique Fédérale de Lausanne (EPFL) CM - Ecublens, Lausanne (CH)

( * ) Notice: Subject to any disclaimer, the term of this patent is extended or adjusted under 35 U.S.C. 154(b) by 676 days.

(21) Appl. No.: 11/296,224

(22) Filed: Dec. 8, 2005

(65) Prior Publication Data

US 2006/0120614 A1 Jun. 8, 2006

Related U.S. Application Data

(60) Provisional application No. 60/634,114, filed on Dec. 8, 2004.

(51) Int. Cl.
*G06K 9/36* (2006.01)
*H04N 7/12* (2006.01)

(52) U.S. Cl. .................... 382/240; 375/240.21
(58) Field of Classification Search ......... 382/232–233, 382/240, 245, 248, 251, 260, 261, 263, 264; 375/240.11, 240.13, 240.14, 240.19, 240.2, 375/240.21, 240.23; 704/226, 230, 233
See application file for complete search history.

(56) References Cited

U.S. PATENT DOCUMENTS

| | | | |
|---|---|---|---|
| 6,173,084 B1 * | 1/2001 | Aach et al. .................. 382/260 |
| 6,381,276 B1 | 4/2002 | Pesquet-Popescu | |
| 6,801,573 B2 * | 10/2004 | Zheng ................... 375/240.11 |
| 7,068,851 B1 * | 6/2006 | Berkner ...................... 382/261 |
| 7,154,557 B2 * | 12/2006 | Itoh et al. ................... 348/453 |
| 2004/0078200 A1 * | 4/2004 | Alves ......................... 704/233 |
| 2005/0074163 A1 * | 4/2005 | Shaked ....................... 382/162 |

OTHER PUBLICATIONS

International Telecommunication Union, Telecommunication Standardization Sector, Study Period 1997-2000, Draft Text of Recommendation H.263 Version 2 ("H.263+") for Decision, 1998.
P.J. Burt and E.H. Adelson, "The Laplacia pyramid as a compact image code," *IEEE Transactions on Communications*, vol. 31, No. 4, pp. 532-540, 1983.
"Three-dimensional lifting schemes for motion compensated video compression", in Proceedings of the IEEE International Conference on Acoustics, Speech and Signal Processing, Salt Lake City, UT, May 2001, vol. 3, pp. 1793-1796, 2001.

* cited by examiner

*Primary Examiner*—Kanji Patel
(74) *Attorney, Agent, or Firm*—Harness, Dickey & Pierce, PLC

(57) ABSTRACT

A method for decomposing a digital image at resolution R and MR into a set of spatial sub-bands of resolution R and MR where MR>R and where the high-band at resolution MR is calculated by subtracting the filtered and up-sampled image at resolution R from the image at resolution MR and where the spatial low-band at resolution R is calculated by adding the filtered and down-sampled spatial high-band to the image at resolution R and where a rational factor for up- and down-sampling M is determined by the resolution ratio.

18 Claims, 2 Drawing Sheets

METHOD FOR SPATIALLY SCALABLE VIDEO CODING

PRIORITY STATEMENT

This application claims the benefit of U.S. Provisional Patent Application No. 60/634,114, filed on Dec. 8, 2004, in the U.S. Patent and Trademark Office, the disclosure of which is incorporated herein in its entirety by reference.

INTRODUCTION

The invention relates to a method for encoding a sequence of images to generate a spatially scalable representation of that sequence. A representation for a sequence of images is spatially scalable if a subset of this representation is decodable and where the output of this decoding is a sequence of images with lower spatial resolution when compared to the spatial resolution of the original sequence. Given a set of sequences which comprises of the sequence at original spatial resolution and of desired sequences at lower spatial resolution, the present invention permits spatially scalable representations of the original sequence by means of spatial sub-band decompositions.

The invention relates to the inter-resolution decomposition as well as to the inter-resolution composition. The inter-resolution decomposition is employed to pairs of images at different resolutions. The decomposition generates a spatial low-band at lower resolution and a spatial high-band at higher resolution. The inter-resolution composition reverses this process.

For video coding, these spatial sub-bands are coded either directly or indirectly with further decomposition. In any case, lossy coding causes quantization noise in the spatial sub-bands. The inter-resolution decomposition and the corresponding inter-resolution composition are such that the quantization noise in the spatial sub-bands has the least impact on the reconstructed high-resolution image sequence while permitting a coding scheme with perfect reconstruction.

BACKGROUND ART

Spatial scalability of video signals can be achieved with critically sampled spatial wavelet schemes but also with overcomplete spatial representations. Critically sampled schemes struggle with the problem that critically sampled high-bands are shift-variant. Therefore, efficient motion compensation is challenging. On the other hand, overcomplete representations can be shift-invariant, thus permitting efficient motion compensation in the spatial sub-bands, but they have to be designed carefully to achieve high compression efficiency. This invention proposes an image processing method for decomposing two different spatial scales of the same image. The method is such that it minimizes the impact of the quantization noise on the reconstructed high-resolution video signal at the decoder.

Rate-distortion efficient coding of image sequences can be accomplished with motion-compensated temporal transforms as proposed in the U.S. Pat. No. 6,381,276 and the corresponding academic publication "Three-dimensional lifting schemes for motion compensated video compression", in "Proceedings of the IEEE International Conference on Acoustics, Speech and Signal Processing, Salt Lake City, Utah, May 2001, vol. 3, pp. 1793-1796. Employing the temporal transform directly to the images of the sequence may be too limiting for targeted scalability properties of video representations. In particular, desirable video coding schemes should provide efficient spatial scalability of the video signal. If a motion-compensated temporal transform is utilized, it is favorable to employ this transform to the spatial sub-bands of the input images. Such architectures achieve good spatial scalability but are burdened by degradation in rate-distortion performance. This burden is rooted in the fact that spatial decompositions utilize either critically sampled representations or overcomplete representations of the spatial sub-bands. Critically sampled representations lack the property of shift-invariance which seems to be crucial for efficient motion compensation. On the other hand, overcomplete representations can be shift-invariant, but rate-distortion efficient encoding is challenging.

This invention proposes a video coding scheme with spatial scalability properties that can be interpreted as an extension of the spatial scalability concept as it is known from, e.g., the video coding standard ITU-T Recommendation H.263: The pictures of the spatial base layer are spatially up-sampled in order to obtain pictures with the same spatial resolution as the pictures of the next spatial enhancement layer. These up-sampled pictures are used to predict the pictures of the next spatial enhancement layer. But this spatial prediction is just one step in our inter-resolution decomposition which requires also a spatial update step. The spatial update step will provide the desired property that spatial prediction is not capable of.

The invented multiresolution representation for images is related to the Laplacian pyramid as proposed in the academic publication by P. J. Burt and E. H. Adelson, "The Laplacian pyramid as a compact image code," *IEEE Transactions on Communications*, vol. 31, no. 4, pp. 532-540, April 1983. The basic idea of the Laplacian pyramid is the following: First, a coarse approximation of the original image is derived by low-pass filtering and down-sampling. Based on this coarse version, the original is predicted by up-sampling and filtering, and the difference is calculated as the prediction error. For the reconstruction, the signal is obtained by simply adding back the difference to the prediction from the coarse signal.

SUMMARY OF THE INVENTION

This invention relates to a method for encoding a sequence of images to generate a spatially scalable representation of that sequence. The invention comprises the inter-resolution decomposition as well as the inter-resolution composition.

Given a set of sequences containing both the one at original resolution and the desired at lower spatial resolution, the inter-resolution decomposition decomposes an image at two different resolutions into a spatial sub-band which is of lower spatial resolution and a spatial high-band which is of higher spatial resolution. The spatial high-band is calculated by subtracting the filtered and up-sampled image at lower resolution from the image at higher resolution. This is called the prediction step. The spatial low-band is calculated by adding the filtered and down-sampled spatial high-band to the image at lower resolution. This is called the update step. Note that the rational factor for up- and down-sampling is determined by the resolution ratio between the low- and high-resolution images.

The inter-resolution composition reverses this process. The low-resolution image is calculated by subtracting the filtered and down-sampled spatial high-band from the spatial low-band. This is the corresponding update step. The high-resolution image is calculated by adding the filtered and up-sampled low-resolution image to the spatial high-band. This is the corresponding prediction step.

The inter-resolution decomposition is an extension of the Laplacian pyramid which uses only the prediction step which is up-sampling and filtering a coarse version of the image to predict a finer version of the image. This spatial prediction is just one step in the present invention which requires also the spatial update step. This spatial update step provides the desired decomposition and composition that the classic Laplacian pyramid is not capable of.

Only with this additional spatial update step, the inter-resolution decomposition and the corresponding inter-resolution composition are such that the quantization noise due to coding of the spatial sub-bands has the least impact on the reconstructed high-resolution image sequence while permitting a coding scheme with perfect reconstruction.

BRIEF DESCRIPTION OF THE DRAWINGS

The present invention will now be described, by way of examples, with reference, if necessary, to the accompanying drawings in which.

DETAILED DESCRIPTION OF THE INVENTION

Figure 1:
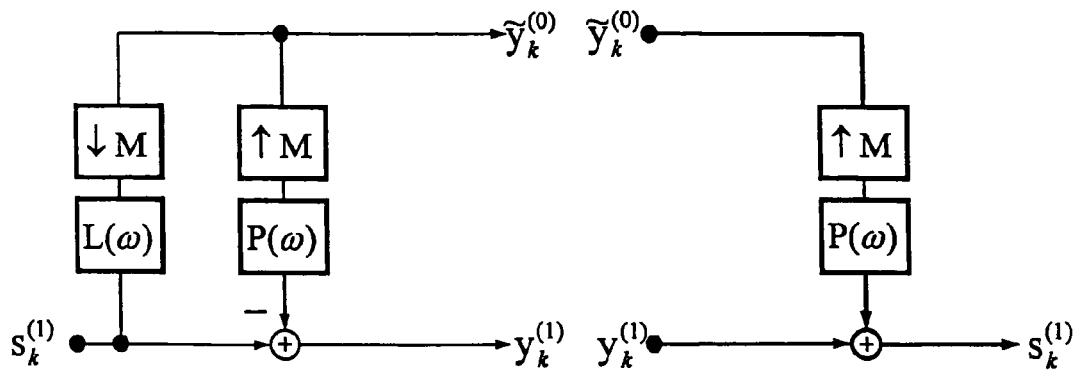
FIG. 1 illustrates the prior art, also known as the Laplacian pyramid.

The invented multiresolution representation for images is related to the Laplacian pyramid as depicted in FIG. 1. In this prior art, a coarse approximation of the original image is derived by low-pass filtering and down-sampling. Based on this coarse version, the original is predicted by up-sampling and filtering, and the difference is calculated as the prediction error. For the reconstruction, the signal is obtained by simply adding back the difference to the prediction from the coarse signal.

Figure 2:
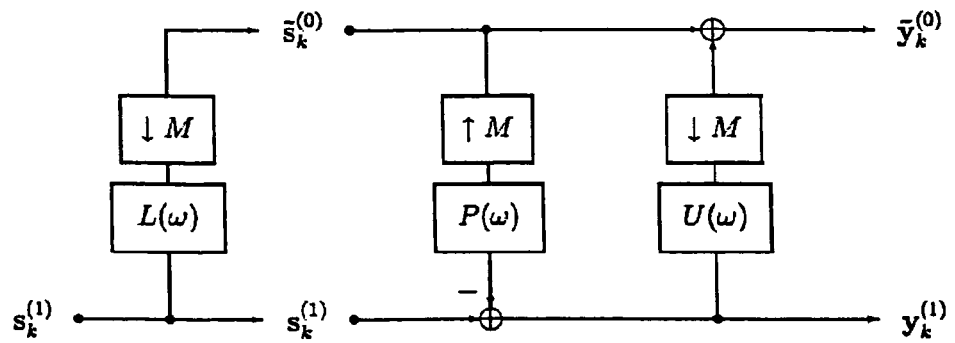
FIG. 2 illustrates the inter-resolution decomposition for the high-resolution image $S_k^{(1)}$ and the low-resolution image $\tilde{S}_k^{(0)}$ which is generated with the low-pass filter $L(\omega)$. The resulting low-band image is denoted by $\tilde{y}_k^{(0)}$, the resulting high-band image by $y_k^{(1)}$.

Now, assume that we have the k-th pictures of an image sequence in CIF resolution $S_k^{(1)}$. (CIF is "Common Intermediate Format".) For the lower resolution, we target a sequence of QCIF images and select the sampling factor M=2 (QCIF is "Quarter CIF".) The pictures $\tilde{S}_k^{(0)}$ in QCIF resolution are obtained by sub-sampling the corresponding ones in CIF resolution by 2. Before sub-sampling, we employ the low-pass filter $L(\omega)$. Given these pictures in QCIF and CIF resolution, we employ the inter-resolution decomposition as depicted in FIG. 2 to obtain the spatial low-band $\tilde{y}_k^{(0)}$ in QCIF resolution and the spatial high-band $y_k^{(1)}$ in CIF resolution. A lifting implementation is used for the scheme where the prediction step uses up-sampling with factor M and filtering with $P(\omega)$, and the update step filtering with $U(\omega)$ and down-sampling with factor M. $\omega$ denotes the spatial frequency of the filter transfer function.

A preferred embodiment of the method utilizes filters U that are orthogonal to P with respect to the sampling factor M. Another preferred embodiment of the method uses filters $U(\omega)$ that are orthogonal to $P(\omega)$ for spatial frequencies of the image at lower resolution, i.e., $$U(\omega) = \frac{P*(\omega)}{|P(\omega)|^2},$$

where $P^*(\omega)$ denotes the complex conjugate of $P(\omega)$.

Figure 3:
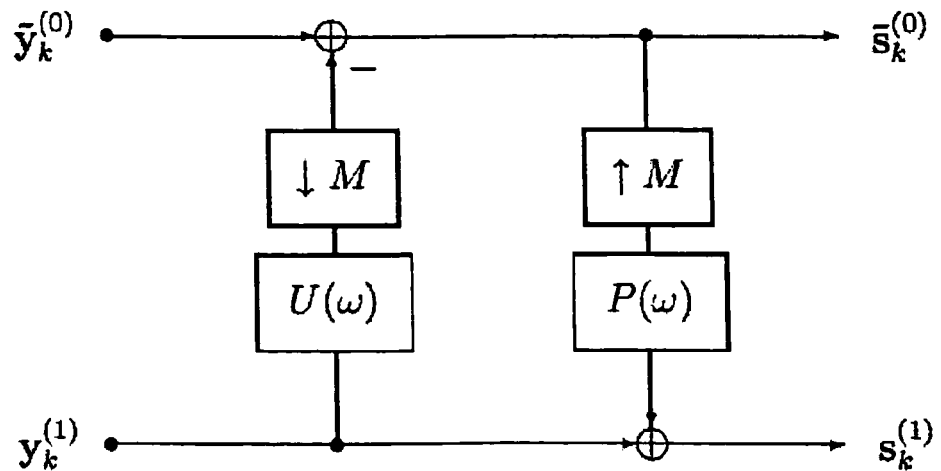
FIG. 3 depicts the inter-resolution composition for the high-band image $y_k^{(1)}$ and the low-band image $\tilde{y}_k^{(0)}$.

Depending on the filters $P(\omega)$ and $U(\omega)$, we achieve only approximately perfect de-correlation with the decomposition. We design the inter-resolution decomposition to minimize the impact of the quantization noise on the reconstructed images in CIF resolution. At the decoder, we utilize the inter-resolution composition as depicted in FIG. 3. Note that the images $\tilde{y}_k^{(0)}$ in QCIF resolution (see FIG. 2) are chosen to represent the spatial base layer. With that, the spatial high-band can be dropped without degrading the spatial base layer. This is a desirable feature for spatially scalable video coding. The up-sampling filter $P(\omega)$ and the down-sampling filter $U(\omega)$ correspond to the filters in FIG. 2. The inter-resolution composition scheme utilizes the same rational sampling factor M than the corresponding decomposition scheme.

This inter-resolution decomposition is an extension of "upward prediction" as it is used in ITU-T Recommendation H.263 to achieve spatial scalability. Upward prediction only does not provide the proper decomposition. The advantages of the inter-resolution decomposition are as follows: First, additional quantization noise due to SNR scalability has the least impact on the reconstructed high-resolution video as the composition is able to suppress quantization noise efficiently. Second, the features of spatial scalability can be carefully chosen at the encoder such that the decoder is able to reconstruct efficiently the desired spatial sub-resolutions. Third, accurate motion compensation is possible in all sub-bands as we use a shift-invariant representation.

The invented video coding scheme decomposes spatially the input pictures of various sizes into spatial sub-bands. This spatial decomposition is accomplished with the inter-resolution decomposition scheme. Depending on the chosen filters $P(\omega)$ and $U(\omega)$, the decorrelation properties of the inter-resolution decomposition can be close to optimal permitting an efficient rate-distortion performance. This decomposition assures an efficient embedded representation of the image sequence at various resolutions. The spatial low-band can be critically sampled to reduce the encoding/decoding complexity of the spatial base layer. On the other hand, the spatial high-bands keep their shift-invariance property and permit efficient motion compensation.

Figure 4:
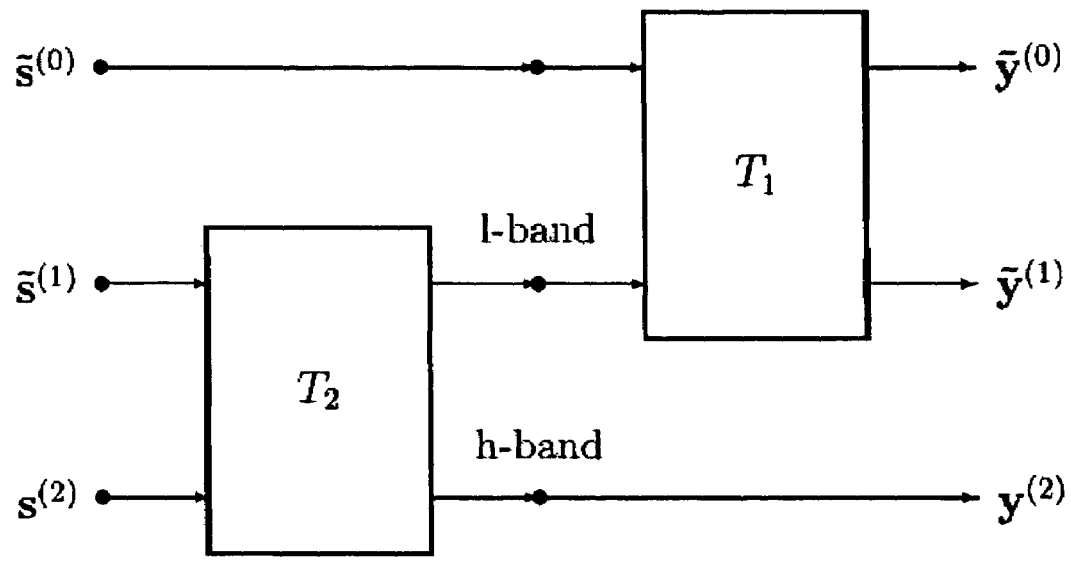
FIG. 4 depicts the decomposition of 3 resolution levels.

The spatial decomposition of 3 resolution levels is depicted in FIG. 4. For example, $\tilde{s}^{(0)}$ corresponds to the signal in QCIF resolution, $\tilde{s}^{(1)}$ to the signal in CIF resolution, and $s^{(2)}$ to the signal in 4CIF resolution while the sampling factors are $M_1=M_2=2$. $\tilde{y}^{(0)}$ is the low-band which can be represented in QCIF resolution, $\tilde{y}^{(1)}$ is the first high-band which can be represented in CIF resolution, and $\tilde{y}^{(2)}$ is the second high-band which is represented in 4CIF resolution. (4CIF is "Four CIF".) The filters in the decomposition $T_1$ and $T_2$ have to be selected such that the 3-resolution composition is able to suppress efficiently the quantization noise in the reconstructed high-resolution images. Note that the images $\tilde{y}^{(0)}$ in QCIF resolution as well as the "I-band" images in CIF resolution are chosen to represent the spatial base layer and the first spatial enhancement layer, respectively. With that, spatial high-bands can be dropped without degrading the retained spatial sub-layers.

Figure 5:
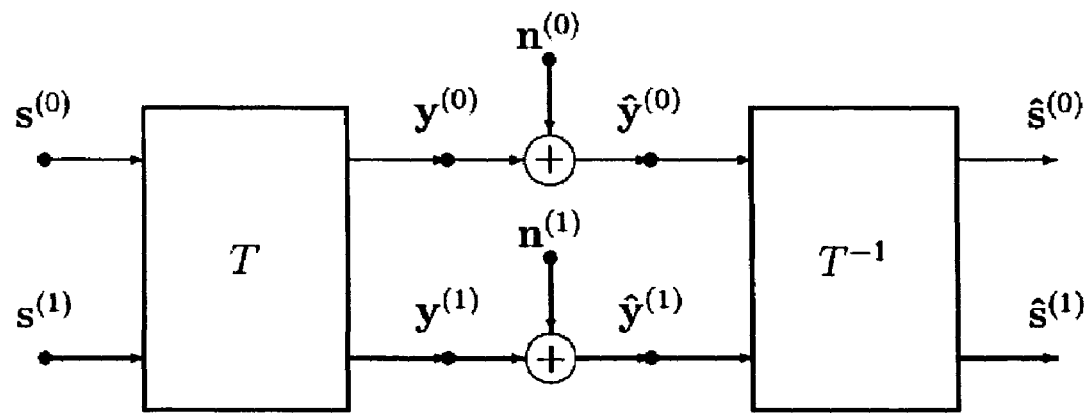
FIG. 5 illustrates the coding system with a model for quantization noise due to lossy coding.

The coding system with a model for quantization noise is illustrated in FIG. 5 for 2 resolution levels. Assume that the quantization noise is additive, has the same variance for both low- and high-band, and is statistically independent from the image signal. With our method, the reconstructed high-resolution image may not be affected by the total sum of the quantization noise energies. If the update step with filter $U(\omega)$ is omitted (as in the case of the Laplacian pyramid), this property cannot be achieved.

The sampling factor M of the scheme is not limited to the factor 2 as described so far. Preferred embodiments of the method utilize integer values larger than 1 for the sampling rate factor M. Other preferred embodiments of the method use a rational fraction M>1 for the sampling rate. For that, well known methods for rational re-sampling may be employed.

The invention claimed is:

1. A method for decomposing a digital image at resolution R and MR into a set of spatial sub-bands of resolution R and MR where MR>R, the method comprising:
    filtering and up-sampling the image at resolution R using one or more up-sampling filters;
    calculating the high-band at resolution MR by subtracting the filtered and up-sampled image at resolution R from the image at resolution MR;
    filtering and down-sampling a spatial high-band using one or more down-sampling filters;
    calculating a spatial low-band at resolution R by adding the filtered and down-sampled spatial high-band to the image at resolution R; and
    determining a rational factor for up- and down-sampling M based on a resolution ratio.

2. The method according to claim 1, wherein the up-sampling filter $P(\omega)$ and the down-sampling filter $U(\omega)$ are low-pass filters.

3. A method for composing a spatial high-band at resolution MR and a spatial low-band at resolution R where MR>R, the method comprising:
    filtering and down-sampling a spatial high-band using one or more down-sampling filters;
    calculating the image at resolution R by subtracting the filtered and down-sampled spatial high-band from the spatial low-band;
    filtering and up-sampling the image at resolution R using one or more up-sampling filters;
    calculating the image at resolution MR by adding the up-sampled and filtered image at resolution R to the spatial high-band; and
    determining a rational factor for up- and down-sampling M based on a resolution ratio.

4. The method according to claim 3, wherein the rational sampling factor M corresponds to the rational factor used during a decomposing step, and where the up-sampling filter $P(\omega)$ and the down-sampling filter $U(\omega)$ correspond to filters selected during a decomposing step.

5. A method for decomposing three images at resolutions R, $M_1R$, and $M_1M_2R$, the method comprising:
    decomposing the images at resolution $M_1M_2R$ and $M_1R$; and
    decomposing a resulting spatial low-band at resolution $M_1R$ and the image at resolution R according to the method of claim 1,
    wherein $M_1>1$ and $M_2>1$, $M_1$ and $M_2$ being rational factors.

6. A method for decomposing three images at resolutions R, $M_1R$, and $M_1M_2R$, the method comprising:
    decomposing the images at resolution $M_1M_2R$ and $M_1R$; and
    decomposing a resulting spatial low-band at resolution $M_1R$ and the image at resolution R according to the method of claim 2,
    wherein $M_1>1$ and $M_2>1$, $M_1$ and $M_2$ being rational factors.

7. A method for composing three spatial sub-bands at resolution R, $M_1R$, and $M_1M_2R$, the method comprising:
    composing the spatial sub-bands at resolution $M_1R$ and R;
    composing a resulting image at resolution $M_1R$ and the spatial high-band at resolution $M_1M_2R$ according to claim 3, wherein the rational factors $M_1$ and $M_2$ as well as the up-sampling filters and the down-sampling filters correspond to filters selected during a decomposing step.

8. A method for decomposing more than 3 digital images at resolution R, $M_1R$, $M_1M_2R$, and $M_1M_2M_3R$, where $M_1$, $M_2$, and $M_3$ are rational sampling factors, $M_1>1$, $M_2>1$, and $M_3>1$, the method comprising:
    performing a first decomposing operation on the two highest resolutions;
    performing a second decomposing operation on a resulting spatial low-band and an image at the next lower resolution according to claim 1; and
    repeating the second decomposing operation until resolution R is reached.

9. A method for decomposing more than 3 digital images at resolution R, $M_1R$, $M_1M_2R$, $M_1M_2M_3R$, where $M_1$, $M_2$, and $M_3$ are rational sampling factors, $M_1>1$, $M_2>1$, and $M_3>1$, the method comprising:
    performing a first decomposing operation on the two highest resolutions;
    performing a second decomposing operation on a resulting spatial low-band and an image at the next lower resolution are according to claim 2; and
    repeating the second decomposing operation until resolution R is reached.

10. A method for composing more than 3 spatial sub-bands at resolution R, $M_1R$, $M_1M_2R$, $M_1M_2M_3R$, where $M_1$, $M_2$, and $M_3$ are rational factors, the method comprising:
    performing a first composing operation on the spatial sub-bands at resolution R and $M_1R$;
    performing a second composing operation on the resulting image at a higher resolution and the spatial high-band at a next higher resolution according to claim 3; and
    repeating the second composing operation until a highest resolution is composed, wherein the rational factors $M_1$, $M_2$, and $M_3$, as well as the up-sampling filters and the down-sampling filters correspond to filters selected during a decomposing step.

11. A video encoding method, the method comprising:
    decomposing images of a video sequence using the method according to claim 1,
    wherein resulting sequences of spatial sub-bands having a same resolution are encoded either with or without further processing.

12. A video encoding method, the method comprising:
    decomposing images of a video sequence using the method according to claim 5,
    wherein resulting sequences of spatial sub-bands having a same resolution are encoded either with or without further processing.

13. A video encoding method, the method comprising:
    decomposing images of a video sequence using the method according to claim 6,
    wherein resulting sequences of spatial sub-bands having a same resolution are encoded either with or without further processing.

14. A video encoding method, the method comprising:
decomposing images of a video sequence using the method according to claim 8,
wherein resulting sequences of spatial sub-bands having a same resolution are encoded either with or without further processing.

15. A video encoding method, the method comprising:
decomposing images of a video sequence using the method according to claim 9,
wherein resulting sequences of spatial sub-bands having a same resolution are encoded either with or without further processing.

16. A video decoding method, the method comprising:
decoding at least two sequences of spatial sub-bands either with or without further processing, the at least two sequences of spatial sub-bands having the same resolution within each sequence but having different resolutions for different sequences,
wherein the decoded spatial sub-bands of different resolution are composed using the method according to claim 3, based on available resolutions of the sub-band sequences.

17. A video decoding method, the method comprising:
decoding at least two sequences of spatial sub-bands either with or without further processing, the at least two sequences of spatial sub-bands having a same resolution within each sequence but having different resolutions for different sequences,
wherein the decoded spatial sub-bands of different resolution are composed using the method according to claim 7, based on available resolutions of the sub-band sequences.

18. A video decoding method, the method comprising:
decoding at least two sequences of spatial sub-bands either with or without further processing, the at least two sequences of spatial sub-bands having a same resolution within each sequence but having different resolutions for different sequences,
wherein the decoded spatial sub-bands of different resolution are composed using the method according to claim 10 based on available resolutions of the sub-band sequences.

* * * * *